US009217446B2

(12) United States Patent
Ohtsuka et al.

(10) Patent No.: US 9,217,446 B2
(45) Date of Patent: Dec. 22, 2015

(54) HYDRAULIC CONTROLLER

(75) Inventors: Shuhei Ohtsuka, Kakogawa (JP); Takaaki Kunishiro, Kobe (JP); Tomohisa Yoshimura, Akashi (JP); Yasushi Sotani, Kobe (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 871 days.

(21) Appl. No.: 13/505,412

(22) PCT Filed: Jul. 6, 2010

(86) PCT No.: PCT/JP2010/004401

§ 371 (c)(1),
(2), (4) Date: May 30, 2012

(87) PCT Pub. No.: WO2011/058681

PCT Pub. Date: May 19, 2011

(65) Prior Publication Data

US 2012/0240566 A1 Sep. 27, 2012

(30) Foreign Application Priority Data

Nov. 10, 2009 (JP) ................................ 2009-257452

(51) Int. Cl.
*F16D 31/02* (2006.01)
*F15B 1/02* (2006.01)
(Continued)

(52) U.S. Cl.
CPC ............... *F15B 1/024* (2013.01); *E02F 9/2095* (2013.01); *E02F 9/2217* (2013.01);
(Continued)

(58) Field of Classification Search
CPC .................. F15B 2211/633; F15B 2211/6309; F15B 15/18; F15B 2211/20561; F15B 1/024; F15B 1/027; F15B 1/033; F15B 2201/51; F15B 211/212
USPC ........................................................... 60/475
See application file for complete search history.

(56) References Cited

U.S. PATENT DOCUMENTS 3,818,801 A 6/1974 Kime
4,337,620 A * 7/1982 Johnson ......................... 60/418
(Continued)

FOREIGN PATENT DOCUMENTS

CN 102203434 A 9/2011
DE 199 13 784 A1 9/2000
(Continued)

OTHER PUBLICATIONS

International Search Report issued in International Patent Application No. PCT/JP2010/004401 dated Aug. 3, 2010.
(Continued)

*Primary Examiner* — Michael Leslie
(74) *Attorney, Agent, or Firm* — Oliff PLC

(57) ABSTRACT

A hydraulic controller includes: an accumulator connected to a main oil passage; a pressure storage use oil passage which branches off from the main oil passage and leads to the accumulator; an inlet port; a priority port; and a bypass port. The hydraulic controller includes a priority valve configured such that, at the time of storing pressure in the accumulator, of pressure oil that flows into the inlet port, the pressure oil at a flow rate for storing of pressure in the accumulator, which is a preset flow rate, flows out of the priority port, and the pressure oil at a surplus flow rate, which is a flow rate obtained by subtracting the flow rate for storing of pressure from the flow rate of the pressure oil flowing into the input port, flows out of the bypass port.

6 Claims, 3 Drawing Sheets

(51) Int. Cl.
*E02F 9/20* (2006.01)
*E02F 9/22* (2006.01)

(52) U.S. Cl.
CPC ............ *E02F 9/2235* (2013.01); *E02F 9/2289* (2013.01); *E02F 9/2296* (2013.01); *F15B 2211/20515* (2013.01); *F15B 2211/20546* (2013.01); *F15B 2211/20561* (2013.01); *F15B 2211/212* (2013.01); *F15B 2211/27* (2013.01); *F15B 2211/30515* (2013.01); *F15B 2211/625* (2013.01); *F15B 2211/633* (2013.01); *F15B 2211/6306* (2013.01); *F15B 2211/785* (2013.01); *F15B 2211/88* (2013.01)

(56) References Cited

U.S. PATENT DOCUMENTS 4,683,909 A * 8/1987 Wittich .................... 137/505.11
4,930,975 A * 6/1990 Ito ................................ 414/635
5,181,380 A * 1/1993 Favre et al. ..................... 60/405
5,813,312 A 9/1998 Arai et al.
5,826,487 A * 10/1998 A'Hearn ......................... 91/516
2003/0182938 A1* 10/2003 Smith ............................. 60/422
2005/0001567 A1* 1/2005 Yoshimatsu .................... 318/34
2007/0251400 A1 11/2007 Glass et al.
2008/0110166 A1 5/2008 Stephenson et al.
2009/0217653 A1* 9/2009 Zhang et al. .................... 60/414
2009/0266934 A1* 10/2009 Makino ........................ 244/99.5

FOREIGN PATENT DOCUMENTS

EP 0 440 801 A1 8/1991
JP A-55-27510 2/1980
JP A-9-196014 7/1997
JP A-2002-327714 11/2002
JP A-2003-239903 8/2003
JP A-2004-58204 2/2004
JP B2-3730141 12/2005
JP A-2007-292133 11/2007

OTHER PUBLICATIONS

Oct. 29, 2013 Korean Office Action issued in Korean Application No. 10-2012-7014052.
Feb. 21, 2014 Extended European Search Report issued in European Application No. 10829649.2.
Feb. 27, 2014 Chinese Search Report issued in Chinese Application No. 2101080047935.5 (with partial translation).

* cited by examiner

HYDRAULIC CONTROLLER

TECHNICAL FIELD

The present invention relates to a hydraulic controller.

BACKGROUND ART

A hydraulic system is a system configured to control, by using hydraulic control valves (e.g., a pressure control valve, a solenoid operated switching valve, and a flow rate control valve), at least one of the pressure, direction, and flow rate of pressure oil discharged from a hydraulic pump to a hydraulic actuator (e.g., a single rod hydraulic cylinder or a hydraulic motor). Such hydraulic systems are widely used in the fields of, for example, construction machinery, industrial vehicles, industrial machinery, and ships and vessels. There are cases where a hydraulic controller that forms a part of such a hydraulic system includes an accumulator as an auxiliary power source for the purpose of reducing the size of the hydraulic pump as well as in consideration of an emergency situation where the hydraulic pump breaks down or a power failure occurs. The accumulator is a hydraulic device configured to store hydraulic energy. The accumulator which stores such energy may be of a gas loaded type, spring loaded type, or weight loaded type. The accumulator may store hydraulic pressure in any of the methods as described below.

A first pressure storing method is a method of storing pressure by using a pump dedicated for the storing of pressure, which pump is installed separately from the hydraulic pump which drives the hydraulic actuator. For example, Patent Literature 1 discloses in paragraph 0006 that in the case of a conventional hydraulic circuit, it is necessary to install an electric motor dedicated for driving a pressure storage pump used for storing pressure in an actuator'.

A second pressure storing method is a method of storing pressure when the hydraulic pump remains idle. This method is adopted in a case, for example, where equipment including the hydraulic pump often performs a pressure holding operation in which the flow rate of an inflow to a main circuit may be small, or where a pressure storing mode is performed between cycle operations in which the hydraulic actuator is operated intermittently. For example, Patent Literature 2 discloses in paragraph 0039 that 'pressure oil supplied from a pressure oil supply device during an idle time of a single rod hydraulic cylinder unit is stored in a pressure oil chamber of an accumulator'.

A third pressure storing method is a method of storing pressure by utilizing surplus oil that is produced when the hydraulic actuator is driven by pressure oil discharged from the hydraulic pump. For example, Patent Literature 3 discloses in paragraph 0013 that 'accumulator means stores the pressure of pressure oil, the pressure of which has been increased by pressure increasing means using surplus oil fed from hydraulic control means, and the pressure increasing means is, for example, a single rod hydraulic cylinder configured to increase the pressure of surplus oil by using the pressure of the surplus oil, or a high pressure pump configured to increase the pressure of pressure oil by using a driving force of a hydraulic motor, the driving force of which is generated by the pressure of surplus oil (here, in the case where the pressure increasing means is the single rod hydraulic cylinder, the accumulator means stores the surplus oil)'.

CITATION LIST

Patent Literature

PTL 1: Japanese Laid-Open Patent Application Publication No. 2002-327714

PTL 2: Japanese Laid-Open Patent Application Publication No. 2004-58204

PTL 3: Japanese Laid-Open Patent Application Publication No. 2007-292133

SUMMARY OF INVENTION

Technical Problem

The above-described first to third pressure storing methods have problems as described below.

In the case of the first pressure storing method, there is a problem that the overall size of the hydraulic controller cannot be made compact since it is necessary for the hydraulic controller, which includes a pump dedicated for the storing of pressure, to further include a peripheral hydraulic device (i.e., an electric motor) for the pump dedicated for the storing of pressure and also include piping.

In the case of the second pressure storing method, surplus oil that is produced when the hydraulic actuator is driven by the hydraulic pump cannot be utilized efficiently. Thus, there is room for improvements in terms of energy saving.

In the case of the third pressure storing method, if a pump speed control method using a variable speed motor is adopted for the purpose of energy saving or the like, then pressure oil is discharged from the hydraulic pump to the hydraulic actuator only at a required flow rate. As a result, there is a problem that a sufficient amount of surplus oil for use in the storing of pressure in the accumulator is not easily produced.

In view of the above, the present invention aims to perform, even in a case where a pump speed control method using a variable speed motor is adopted and surplus oil is not easily produced, the storing of pressure in the accumulator in a stable manner regardless of the magnitude of a load and an operating speed.

Solution to Problem

A main invention for solving the above-described problems is a hydraulic controller including: a hydraulic drive circuit driven by a variable speed motor and including a hydraulic pump configured to discharge pressure oil in an amount corresponding to a rotational frequency of the variable speed motor, the hydraulic drive circuit supplying to and receiving from a hydraulic actuator the pressure oil discharged from the hydraulic pump to drive the hydraulic actuator; a hydraulic pressure storage circuit including an accumulator and configured to store the pressure oil in the accumulator and to supply the pressure oil stored in the accumulator to the hydraulic actuator in a predetermined case; and a flow rate control mechanism including an inlet port, a first outlet port, and a second outlet port. The flow rate control mechanism is configured such that: the inlet port is connected to a first main oil passage through which the pressure oil discharged from the hydraulic pump of the hydraulic drive circuit flows; the first outlet port is connected to an oil passage leading to the accumulator of the hydraulic pressure storage circuit; the second outlet port is connected to a second main oil passage through which the pressure oil is supplied to the hydraulic actuator of the hydraulic drive circuit; and of the pressure oil that flows into the inlet port, the pressure oil at a flow rate for storing of pressure in the accumulator, which is a preset flow rate, flows out of the first outlet port, and the pressure oil at a surplus flow rate, which is a flow rate obtained by subtracting the flow rate for storing of pressure from the flow rate of the pressure oil flowing into the inlet port, flows out of the second outlet port.

According to the above hydraulic controller, in the case of a hydraulic system that adopts a pump speed control method using a variable speed motor, the flow rate control mechanism is disposed on an oil passage for use in pressure storage, the oil passage extending from the first main oil passage to the accumulator. Accordingly, pressure oil at a stable flow rate can be used for the storing of pressure in the accumulator regardless of loads on the first and second outlet ports as well as the operating speed of the hydraulic actuator. Moreover, a pump dedicated for the storing of pressure in the accumulator is no longer necessary, which makes it possible to realize a compact size of the hydraulic controller, and to eventually realize a compact size of the hydraulic system.

The above hydraulic controller may further include a communication allowing/blocking device configured to alternatively allow or block communication between the first main oil passage and the second main oil passage.

The above hydraulic controller may further include a pressure detector configured to detect pressure stored in the accumulator. The communication allowing/blocking device may be configured to: allow the first main oil passage and the second main oil passage to be in communication with each other if the pressure detected by the pressure detector is higher than a predetermined pressure; and block the communication between the first main oil passage and the second main oil passage if the pressure detected by the pressure detector is lower than the predetermined pressure.

According to the above hydraulic controller, at the time of storing pressure in the accumulator, the communication allowing/blocking device prevents the pressure oil from being directly supplied from the hydraulic pump through the first main oil passage and the second main oil passage to the hydraulic actuator, and allows the pressure oil to be assuredly supplied to the inlet port of the flow rate control mechanism, and also, the pressure oil is supplied from the inlet port of the flow rate control mechanism to the hydraulic actuator in a bypassing manner through the second outlet port and the second main oil passage. Accordingly, the operation of the hydraulic actuator can be continued even while storing of pressure in the actuator is being performed.

In the above hydraulic controller, the flow rate control mechanism may be a priority valve.

The above hydraulic controller may include: a flow rate adjusting valve of which an inlet port serves as the inlet port of the flow rate control mechanism and of which an outlet port serves as the first outlet port of the flow rate control mechanism; and a pressure control valve of which an inlet port is connected to the inlet port of the flow rate adjusting valve and of which an outlet port serves as the second outlet port of the flow rate control mechanism. The pressure control valve may be configured such that the inlet port and the outlet port of the pressure control valve are brought into communication with each other if a hydraulic pressure at the inlet port of the flow rate adjusting valve and a hydraulic pressure at the inlet port of the pressure control valve are higher than a predetermined pressure and a hydraulic pressure at the outlet port of the flow rate adjusting valve is higher than a predetermined pressure.

Advantageous Effects of Invention

According to the present invention, even in a case where a pump speed control method using a variable speed motor is adopted and surplus oil is not easily produced, the storing of pressure in the accumulator can be performed in a stable manner.

DESCRIPTION OF EMBODIMENTS

Figure 1:
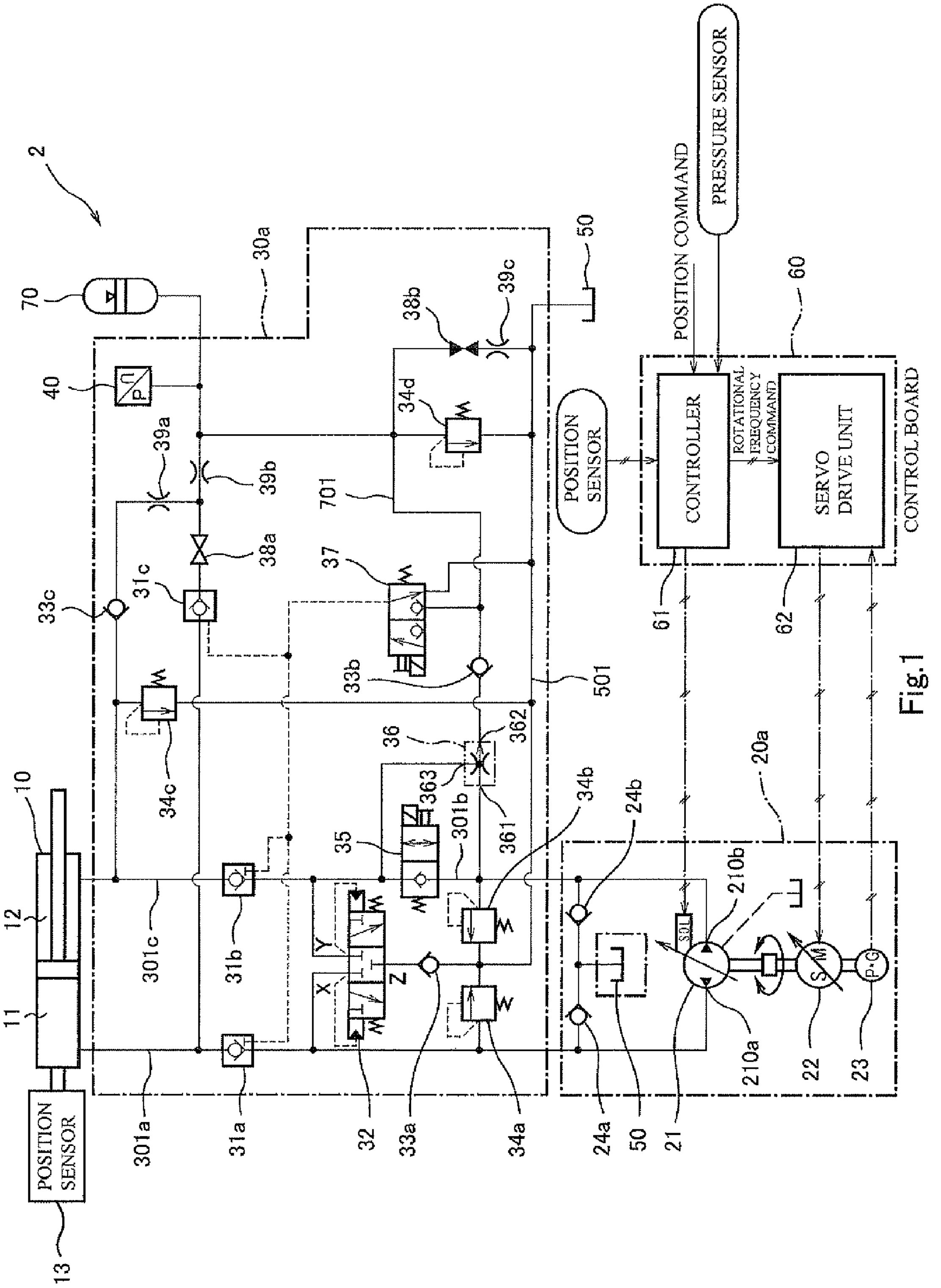
FIG. 1 shows an overall configuration of a hydraulic controller according to Embodiment 1 of the present invention.

Hereinafter, preferred embodiments of the present invention will be described with reference to the accompanying drawings. In the drawings, the same or corresponding components are denoted by the same reference signs, and a repetition of the same description is avoided.

Embodiment 1

Overall Configuration and Functions of Hydraulic Controller

FIG. 1 shows a configuration of a hydraulic controller configured to control a hydraulic actuator, according to Embodiment 1 of the present invention.

A hydraulic controller 2 shown in FIG. 1 adopts a pump speed control method for the purpose of energy saving, noise reduction, and size reduction of a hydraulic system. The pump speed control method herein refers to a method of varying the rotational frequency of a hydraulic pump by means of a variable speed motor. For example, during a pressure holding state, the rotational frequency of the pump can be reduced by using the pump speed control method, and thereby energy can be saved.

The hydraulic controller 2 also includes an accumulator 70 as an auxiliary power source for emergency use. The hydraulic controller 2 controls the driving of a single rod hydraulic cylinder 10 which serves as a hydraulic actuator, and also controls storing of pressure from a reversible pump 21 into the accumulator 70 as well as discharging of pressure oil stored in the accumulator 70 to the hydraulic cylinder 10.

Moreover, the hydraulic controller 2 is configured such that while the storing of pressure from the reversible pump 21 into the accumulator 70 is performed, pressure oil assuredly flows from the reversible pump 21 to both an oil system of a hydraulic drive circuit which serves to drive the hydraulic cylinder 10 and an oil system of a hydraulic pressure storage circuit which serves to store pressure in the accumulator 70, regardless of the magnitude of a load on and the operating speed of the hydraulic cylinder 10. It should be noted that the hydraulic controller 2 is also configured such that the hydraulic cylinder 10 is driven continuously regardless of presence or absence of pressure stored in the accumulator 70.

Furthermore, the hydraulic controller 2 is configured such that when the storing of pressure from the reversible pump 21 into the accumulator 70 is completed, the destination of pressure oil supplied from the reversible pump 21 is limited to the oil system of the hydraulic drive circuit which serves to drive the hydraulic cylinder 10, such that the pressure oil is supplied from the reversible pump 21 to the hydraulic cylinder 10 in a minimum required amount.

The overall configuration of the hydraulic controller 2 includes a pump unit 20*a*, a valve unit 30*a*, the accumulator 70, an oil tank 50, and a control board 60. It should be noted that the pump unit 20*a*, a part of the valve unit 30*a*, and the oil tank 50 constitute the hydraulic drive circuit according to the present invention, and also, the pump unit 20*a*, a part of the valve unit 30*a*, and the accumulator 70 constitute the hydraulic pressure storage circuit according to the present invention.

The pump unit 20*a* includes the reversible pump 21, a variable speed motor 22, a rotational frequency detector 23, and check valves 24*a* and 24*b*.

The reversible pump 21 includes two inlet/outlet ports, and is a hydraulic pump configured to reverse the flow direction of pressure oil by changing the rotation direction of its drive shaft. It should be noted that the reversible pump 21 also serves as a variable displacement pump, and includes a solenoid valve which is configured to switch a preset pump capacity based on an operation command from a controller 61 in order to minimize energy loss (i.e., reduce the pump capacity) during, for example, a pressure holding state (where no flow rate of the pump is required).

An inlet/outlet port 210*a*, which is one of the inlet/outlet ports of the reversible pump 21, is connected to one end of a main oil passage 301*a*. An inlet/outlet port 210*b*, which is the other one of the inlet/outlet ports of the reversible pump 21, is connected to one end of a main oil passage 301*b*. The other end of the main oil passage 301*a* is connected to a head chamber 11 of the hydraulic cylinder 10. A main oil passage 301*c*, which is brought into communication with or blocked from the main oil passage 301*b* by means of a solenoid operated switching valve 35, has its other end connected to a rod chamber 12 of the hydraulic cylinder 10.

In the present embodiment, the main oil passage 301*a* is disposed such that the main oil passage 301*a* extends from the inlet/outlet port 210*a* of the reversible pump 21 through a pilot check valve 31*a* to the head chamber 11 of the hydraulic cylinder 10. The main oil passage 301*a* serves to supply pressure oil discharged from the inlet/outlet port 210*a* to the head chamber 11 through the pilot check valve 31*a*, and to receive pressure oil that flows from the head chamber 11 toward the inlet/outlet port 210*a* through the pilot check valve 31*a*. That is, the main oil passage 301*a* can serves as both a first main oil passage and a second main oil passage according to the present invention.

The main oil passage 301*b* is disposed such that the main oil passage 301*b* extends from the inlet/outlet port 210*b* of the reversible pump 21 to the solenoid operated switching valve 35. The main oil passage 301*b* serves to supply pressure oil discharged from the inlet/outlet port 210*b* to the rod chamber 12 through the solenoid operated switching valve 35 and a pilot check valve 31*b*, and to receive pressure oil that flows from the rod chamber 12 toward the inlet/outlet port 210*b* through the pilot check valve 31*b* and the solenoid operated switching valve 35. That is, when the solenoid operated switching valve 35 is in a closed position, the main oil passage 301*b* corresponds only to the first main oil passage according to the present invention, through which the pressure oil discharged from the inlet/outlet port 210*b* flows. On the other hand, when the solenoid operated switching valve 35 is in an opened position, the main oil passage 301*b* can serve as both the first main oil passage and the second main oil passage according to the present invention.

The main oil passage 301*c* is disposed such that the main oil passage 301*c* extends from the solenoid operated switching valve 35 through the pilot check valve 31*b* to the rod chamber 12 of the hydraulic cylinder 10. The main oil passage 301*c* serves to supply pressure oil to the rod chamber 12 through the pilot check valve 31*b*, and to receive pressure oil that flows from the rod chamber 12 toward the inlet/outlet port 210*b* through the pilot check valve 31*b* and the solenoid operated switching valve 35. That is, when the solenoid operated switching valve 35 is in a closed position, the main oil passage 301*c* corresponds only to the second main oil passage according to the present invention, through which the pressure oil is supplied to the hydraulic cylinder 10. On the other hand, when the solenoid operated switching valve 35 is in an opened position, the main oil passage 301*c* can serve as both the first main oil passage and the second main oil passage according to the present invention.

The variable speed motor 22 is a motor configured to drive the drive shaft of the reversible pump 21, and is also an AC servomotor configured to switch its rotational frequency based on a rotational frequency command from a servo drive unit 62. For the purpose of variable-speed servo control of the servo drive unit 62, the variable speed motor 22 includes the rotational frequency detector 23 which is configured as a pulse generator. In the present embodiment, a synchronous motor is used as the variable speed motor 22. However, as an alternative, an induction motor may be used as the variable speed motor 22. Moreover, the rotational frequency detector 23 is not limited to a pulse generator but may be an encoder configured to detect a rotational position.

The valve unit 30*a* includes a three-port hydraulic switching valve 32, a check valve 33*a*, relief valves 34*a* and 34*b*, and the solenoid operated switching valve 35 as components of the hydraulic drive circuit which drives the hydraulic cylinder 10.

The hydraulic switching valve 32 has two inlet ports X and Y, and one outlet port Z. The hydraulic switching valve 32 is provided among the main oil passage 301*a*, the main oil passage 301*c*, and the oil tank 50. The inlet port X of the hydraulic switching valve 32 is connected to the main oil passage 301*a*. The inlet port Y is connected to the main oil passage 301*c*, and the outlet port Z is connected to an oil passage leading to the oil tank 50. Specifically, in the case of moving the rod of the hydraulic cylinder 10 forward (from the head side to the rod side), the inlet port Y and the outlet port Z are brought into communication with each other owing to the pressure of pressure oil supplied to the inlet port X, whereas in the case of moving the rod of the hydraulic cylinder 10 backward (from the rod side to the head side), the inlet port X and the outlet port Z are brought into communication with each other owing to the pressure of pressure oil supplied to the inlet port Y.

The check valve 33*a* is provided on a drain oil passage (return oil passage) 501 between the oil tank 50 and the outlet port Z of the hydraulic switching valve 32. It should be noted that the inlet port of the check valve 33*a* is connected to the outlet port Z of the hydraulic switching valve 32, and the outlet port of the check valve 33*a* is connected to the oil tank 50. That is, the check valve 33*a* serves to prevent a backflow from the oil tank 50 to the outlet port Z of the hydraulic switching valve 32.

The solenoid operated switching valve 35 alternatively allows or blocks communication between the main oil passage 301*b* and the main oil passage 301*c*. The solenoid operated switching valve 35 is a valve corresponding to a communication allowing/blocking device according to the present invention. The solenoid operated switching valve 35 is provided on the main oil passage 301*c*, and is positioned between the pilot check valve 31*b* and the inlet/outlet port 210*b* of the reversible pump 21. Other than the time of storing pressure in the accumulator 70, the solenoid operated switching valve 35 allows the main oil passage 301*b* and the main oil passage 301*c* to be in communication with each other, thereby allowing pressure oil to flow in both directions between the inlet/outlet port 210_b_ of the reversible pump 21 and the rod chamber 12 of the hydraulic cylinder 10 (i.e., ON state). On the other hand, at the time of storing pressure in the accumulator 70, the solenoid operated switching valve 35 serves to block the communication between the main oil passage 301_b_ and the main oil passage 301_c_, thereby preventing pressure oil from flowing from the inlet/outlet port 210_b_ of the reversible pump 21 to the rod chamber 12 of the hydraulic cylinder 10 (i.e., OFF state). It should be noted that the solenoid operated switching valve 35 shown in FIG. 1 is in the OFF state.

The valve unit 30_a_ includes a priority valve 36, a solenoid operated switching valve 37, pilot check valves 31_a_, 31_b_, and 31_c_, and a pressure sensor 40 as components of a pressure storage drive circuit which uses the accumulator 70 and performs storing of hydraulic pressure.

The priority valve 36 includes an inlet port 361, a priority port 362, and a bypass port 363. The priority valve 36 is provided on a pressure storage use oil passage 701 which extends from the main oil passage 301_b_ to the accumulator 70. The starting point of the pressure storage use oil passage 701 is positioned not on the main oil passage 301_a_ but on the main oil passage 301_b_. The reason for this is that in a case where the hydraulic cylinder 10 moves backward from the rod chamber 12 toward the head chamber 11, surplus oil tends to be produced, and such positioning of the starting point of the pressure storage use oil passage 701 as mentioned above makes it easier to obtain, from the surplus oil, a flow rate necessary for the storing of pressure in the accumulator 70. It should be noted that the starting point of the pressure storage use oil passage 701 may be positioned on the main oil passage 301_a_. Also in this case, the same functions as those exerted in the case where the starting point of the pressure storage use oil passage 701 is positioned on the main oil passage 301_b_ are still exerted.

The priority valve 36 is configured such that, of the pressure oil that has flowed into the inlet port 361, regardless of the flow rate of the pressure oil that has flowed into the inlet port 361 (i.e., an inflow flow rate) and loads on the ports 362 and 363, the pressure oil at a flow rate set for the priority port 362 (i.e., a flow rate for storing of pressure) flows to the priority port 362 prior to the pressure oil at a surplus flow rate, which is a flow rate obtained by subtracting the flow rate for storing of pressure from the inflow flow rate, flows to the bypass port 363.

For example, assume a case where 50 (L/min) is set as a rated flow rate per unit time (per minute) for the inlet port 361; 10 (L/min) is set as a rated flow rate per unit time (per minute) for the priority port 362; and 40 (L/min) is set as a rated flow rate per unit time (per minute) for the bypass port 363. In this case, if the flow rate of pressure oil that flows into the inlet port 361 is 20 (L) per unit time (per minute), then of the pressure oil that has flowed into the inlet port 361, 10 (L) of the pressure oil flows out of the priority port 362, and 10 (L) of the pressure oil flows out of the bypass port 363 as surplus pressure oil. For example, if the flow rate of pressure oil that flows into the inlet port 361 is 5 (L) per unit time (per minute), then all of the 5 (L) of pressure oil that has flowed into the inlet port 361 flows out of the priority port 362 regardless of which of the load on the priority port 362 and the load on the bypass port 363 is greater.

The solenoid operated switching valve 37 is configured to select oil passages extending from the pilot check valves 31_a_, 31_b_, and 31_c_ to the drain oil passage 501 at the time of using pressure oil stored in the accumulator 70 (i.e., OFF state), and to select oil passages extending from the pressure storage use oil passage 701 to the pilot check valves 31_a_, 31_b_, and 31_c_ at the time of driving the hydraulic cylinder 10 with the pump (i.e., ON state). It should be noted that the solenoid operated switching valve 37 shown in FIG. 1 is in the OFF state.

The pilot check valve 31_a_ is provided on the main oil passage 301_a_, and is configured such that the inlet port of the pilot check valve 31_a_ is disposed at the reversible pump 21 side and the outlet port of the pilot check valve 31_a_ is disposed at the hydraulic cylinder 10 side. The pilot port of the pilot check valve 31_a_ is connected to the solenoid operated switching valve 37.

The pilot check valve 31_b_ is provided on the main oil passage 301_c_, and is configured such that the inlet port of the pilot check valve 31_b_ is disposed at the reversible pump 21 side and the outlet port of the pilot check valve 31_b_ is disposed at the hydraulic cylinder 10 side. The pilot port of the pilot check valve 31_b_ is connected to the solenoid operated switching valve 37.

That is, at the time of using pressure oil stored in the accumulator 70, the pilot check valves 31_a_ and 31_b_ serve to block flows of pressure oil from the head chamber 11 and the rod chamber 12 of the hydraulic cylinder 10 toward the inlet/outlet ports 210_a_ and 210_b_ of the reversible pump 21. On the other hand, at the time of driving the hydraulic cylinder 10, the pilot check valves 31_a_ and 31_b_ serve to allow pressure oil to flow in both directions between the head chamber 11 of the hydraulic cylinder 10 and the inlet/outlet port 210_a_ of the reversible pump 21, and to flow in both directions between the rod chamber 12 of the hydraulic cylinder 10 and the inlet/outlet port 210_b_ of the reversible pump 21.

The pilot check valve 31_c_ is provided between the accumulator 70 and the main oil passage 301_a_, and is configured such that the inlet port of the pilot check valve 31_c_ is disposed at the accumulator 70 side and the outlet port of the pilot check valve 31_c_ is disposed at the hydraulic cylinder 10 side. The pilot port of the pilot check valve 31_c_ is connected to the solenoid operated switching valve 37. At the time of using pressure oil stored in the accumulator 70, the pilot check valve 31_c_ serves to allow the stored pressure oil to flow from the accumulator 70 toward the main oil passage 301_a_. On the other hand, at the time of driving the hydraulic cylinder 10 with the pump, the pilot check valve 31_c_ serves to block a flow of the stored pressure oil from the accumulator 70 toward the main oil passage 301_a_.

The pressure sensor 40 is provided on the pressure storage use oil passage 701, and is configured to indirectly detect pressure stored in the accumulator 70. It should be noted that, as an alternative, the pressure sensor 40 may be configured to directly detect pressure stored in the accumulator 70. Furthermore, a pressure switch may be used instead of the pressure sensor 40.

It should be noted that the valve unit 30_a_ includes, for protection of the above-described configuration, the following components: relief valves 34_a_, 34_b_, 34_c_, and 34_d_; stop valves 38_a_ and 38_b_; and throttles 39_a_, 39_b_, and 39_c_. The relief valves 34_a_, 34_b_, 34_c_, and 34_d_ monitor the pressure of pressure oil that flows through their respective installation positions. Each relief valve is configured such that if the monitored pressure of the pressure oil is higher than a predetermined pressure, the relief valve serves to drain out the pressure oil into the oil tank 50 through the drain oil passage 501. The stop valves 38_a_ and 38_b_ are manually operated when, for example, the accumulator is under maintenance. At the time, the stop valves 38_a_ and 38_b_ serve to allow pressure oil to flow or block a flow of pressure oil. The throttles 39_a_, 39_b_, and 39_c_ serve to limit the flow rate of pressure oil that flows through their respective installation positions.

The control board 60 includes the controller 61 and the servo drive unit 62. The control board 60 performs hydraulic control of the entire hydraulic controller 2 (pump speed control, storing of pressure in and discharging of pressure from the accumulator, etc).

The controller 61 includes at least a CPU and a memory. The controller 61 is configured to obtain, from an external device which is not shown, a position command specifying the rod position of the hydraulic cylinder 10, and to obtain rod position information about the hydraulic cylinder 10 which is detected by a position sensor 13, and to perform feedback control of the rod position of the hydraulic cylinder 10. Specifically, each time the controller 61 obtains the rod position information, the controller 61 generates a rotational frequency command for the variable speed motor 22, based on a deviation between the position command and the rod position information, and outputs the rotational frequency command to the servo drive unit 62.

The controller 61 outputs an operation command to switch ON/OFF of the solenoid valve of the reversible pump 21. The capacity of the reversible pump 21 can be changed by the operation command. For example, in the case of high pressure such as at the time of storing pressure in the accumulator, the controller 61 selects a low pump capacity to reduce the torque of a motor, and in the case of low pressure such as at the time of normal operation, the controller 61 selects a high pump capacity to reduce the rotational frequency of the motor.

Further, the controller 61 obtains pressure information about the accumulator 70 which is detected by the pressure sensor 40, and determines whether the storing of pressure in the accumulator 70 is necessary or not. Specifically, the controller 61 monitors whether the pressure information detected by the pressure sensor 40 indicates a pressure higher than a predetermined pressure of the accumulator 70. If the pressure information detected by the pressure sensor 40 indicates a pressure lower than the predetermined pressure of the accumulator 70, the controller 61 determines that the storing of pressure in the accumulator 70 is necessary. If it is determined that the storing of pressure in the accumulator 70 is necessary, the controller 61 outputs an operation command to perform a predetermined switching operation of the solenoid operated switching valve 35.

The servo drive unit 62 includes at least a CPU and a memory. The servo drive unit 62 is configured to obtain the rotational frequency command generated by the controller 61 and rotational frequency information detected by the rotational frequency detector 23, and to perform feedback control of the rotational frequency of the variable speed motor 22. Specifically, each time the servo drive unit 62 obtains the rotational frequency information, the servo drive unit 62 generates an inverter command based on a deviation between the rotational frequency command and the rotational frequency information, and outputs the inverter command to the variable speed motor 22.

In the present embodiment, the accumulator 70 is a gas loaded accumulator. However, as an alternative, a spring loaded accumulator or a weight loaded accumulator may be used as the accumulator 70.

[Operations at the Time of Driving Hydraulic Cylinder]

Hereinafter, a description is given of operations that the hydraulic controller 2 shown in FIG. 1 performs at the time of driving the hydraulic cylinder 10.

At the time of driving the hydraulic cylinder 10, the solenoid operated switching valve 35 allows, in response to an operation command from the controller 61, the main oil passage 301*b* and the main oil passage 301*c* to be in communication with each other, thereby allowing pressure oil to flow in both directions between the inlet/outlet port 210*b* of the reversible pump 21 and the rod chamber 12 of the hydraulic cylinder 10. Also, the solenoid operated switching valve 37 selects, in response to an operation command from the controller 61, the oil passages extending from the pressure storage use oil passage 701 to the pilot check valves 31*a*, 31*b*, and 31*c*. Accordingly, the pilot check valves 31*a* and 31*b* allow pressure oil to flow in both directions between the head chamber 11 of the hydraulic cylinder 10 and the inlet/outlet port 210*a* of the reversible pump 21, and in both directions between the rod chamber 12 of the hydraulic cylinder 10 and the inlet/outlet port 210*b* of the reversible pump 21. The pilot check valve 31*c* blocks a flow of pressure oil stored in the accumulator 70 toward the head chamber 11 of the hydraulic cylinder 10.

In the case of moving forward the rod of the hydraulic cylinder 10 from the head chamber 11 side toward the rod chamber 12 side, the reversible pump 21 sucks, from the inlet/outlet port 210*b*, pressure oil in the rod chamber 12 through the pilot check valve 31*b* and the solenoid operated switching valve 35, and discharges the pressure oil from the inlet/outlet port 210*a* toward the head chamber 11 through the pilot check valve 31*a*. It should be noted that since the pressure receiving area of the head chamber 11 is greater than the pressure receiving area of the rod chamber 12, the amount of pressure oil that returns from the rod chamber 12 is not the same as the amount of pressure oil discharged toward the head chamber 11. As a result, the pressure oil that is sucked into the inlet/outlet port 210*b* becomes insufficient. In order to compensate for such shortfall of pressure oil, pressure oil stored in an auxiliary oil tank 50 is sucked into the inlet/outlet port 210*b* of the reversible pump 21 through the check valve 24*b*.

In the case of moving backward the rod of the hydraulic cylinder 10 from the rod chamber 12 side toward the head chamber 11 side, the reversible pump 21 sucks, from the inlet/outlet port 210*a*, pressure oil in the head chamber 11 through the pilot check valve 31*a*, and discharges the pressure oil from the inlet/outlet port 210*b* toward the rod chamber 12 through the solenoid operated switching valve 35 and the pilot check valve 31*b*. It should be noted that the amount of pressure oil that returns from the head chamber 11 is greater than the amount of pressure oil discharged toward the rod chamber 12. Therefore, in order to drain out surplus oil from the head chamber 11 into the oil tank 50 through the drain oil passage 501, the hydraulic switching valve 32 brings the inlet port X and the outlet port Z into communication with each other.

[Operations at the Time of Using Accumulator]

Hereinafter, a description is given of operations that the hydraulic controller 2 shown in FIG. 1 performs at the time of using the accumulator 70. The time of using the accumulator 70 herein refers to, for example, a situation where pressure oil of which the pressure is stored in the accumulator 70 is used at a time of emergency such as a breakdown of the reversible pump 21 or the variable speed motor 22 or an occurrence of a power failure, or a situation where pressure oil of which the pressure is stored in the accumulator 70 is supplementarily used for increasing the flow rate of pressure oil discharged from the reversible pump 21. The present embodiment is intended for the former case. In particular, the present embodiment is intended for an emergency operation that is performed in a case where, for example, a breakdown of the reversible pump 21 has occurred while the rod of the hydraulic cylinder 10 is being moved forward from the head chamber 11 side toward the rod chamber 12 side. The emergency operation is an operation of fully moving forward the rod to the end of the rod chamber 12 by using pressure oil stored in the accumulator 70.

At the time of using the accumulator 70, the solenoid operated switching valve 37 selects, in response to an operation command from the controller 61, the oil passages extending from the pilot check valves 31*a*, 31*b*, and 31*c* to the drain oil passage 501. Accordingly, the pilot check valves 31*a* and 31*b* block a flow of pressure oil from the head chamber 11 of the hydraulic cylinder 10 toward the inlet/outlet port 210*a* of the reversible pump 21, and block a flow of pressure oil from the rod chamber 12 of the hydraulic cylinder 10 toward the inlet/outlet port 210*b* of the reversible pump 21. Here, the pilot check valve 31*c* allows pressure oil stored in the accumulator 70 to flow toward the head chamber 11 of the hydraulic cylinder 10.

Then, the pressure oil stored in the accumulator 70 is supplied to the head chamber 11 of the hydraulic cylinder 10 through the throttle 39*b*, the stop valve 38*a*, and the pilot check valve 31*c*. As a result, the emergency operation of forcibly moving the rod position of the hydraulic cylinder 10 to the end of the rod chamber 12 is started. It should be noted that the stop valve 38*a*, the pilot check valve 31*c*, the hydraulic cylinder 10, a check valve 33*c*, and the throttle 39*a* constitute a hydraulic loop circuit, in which pressure oil discharged from the rod chamber 12 is returned to the inlet port of the pilot check valve 31*c* through the check valve 33*c* and the throttle 39*a*. In this manner, the amount of oil supplied from the accumulator when the rod of the hydraulic cylinder 10 is moved is reduced.

[Operations Performed at the Time of Storing Pressure in Accumulator]

Hereinafter, a description is given of operations that the hydraulic controller 2 shown in FIG. 1 performs at the time of storing pressure in the accumulator 70.

First, the description is given regarding a case where the above-described operations at the time of driving the hydraulic cylinder 10 are being performed in a situation where the storing of pressure in the accumulator 70 is unnecessary. In this case, in response to an operation command from the controller 61, the solenoid operated switching valve 35 allows pressure oil to flow in both directions between the inlet/outlet port 210*b* of the reversible pump 21 and the rod chamber 12 of the hydraulic cylinder 10. Also, in response to an operation command from the controller 61, the solenoid operated switching valve 37 selects the oil passages extending from the pressure storage use oil passage 701 to the pilot check valves 31*a*, 31*b*, and 31*c*.

It should be noted that when the storing of pressure in the accumulator 70 is unnecessary, the operating pressure of the hydraulic cylinder 10 is assuredly lower than the hydraulic pressure at the priority port 362 of the priority valve 36. Therefore, pressure oil does not flow from the inlet/outlet port 210*b* of the reversible pump 21 toward the priority valve 36, and also, pressure oil does not flow from the rod chamber 12 of the hydraulic cylinder 10 toward the bypass port 363 of the priority valve 36 through the pilot check valve 31*b*. Moreover, since a check valve 33*b* for use in preventing a backflow is provided at the priority port 362 side, a situation does not occur where pressure oil stored in the accumulator 70 flows into the priority valve 36.

At the time of driving the hydraulic cylinder 10 as described above, the controller 61 monitors whether pressure information detected by the pressure sensor 40 indicates a pressure higher than the predetermined pressure of the accumulator 70. If the pressure information detected by the pressure sensor 40 indicates a pressure lower than the predetermined pressure of the accumulator 70, the controller 61 determines that the storing of pressure in the accumulator 70 is necessary. Then, the controller 61 outputs, to the solenoid operated switching valve 35, an operation command to prevent pressure oil from flowing from the inlet/outlet port 210*b* of the reversible pump 21 to the rod chamber 12 of the hydraulic cylinder 10. Specifically, the communication between the main oil passage 301*b* and the main oil passage 301*c* is blocked, and the solenoid operated switching valve 35 blocks pressure oil discharged from the inlet/outlet port 210*b* of the reversible pump 21 so that the pressure oil will not directly flow toward the rod chamber 12 of the hydraulic cylinder 10, but allows the pressure oil discharged from the inlet/outlet port 210*b* to flow toward the inlet port 361 of the priority valve 36.

Next, at the time of moving the rod of the hydraulic cylinder 10 backward, pressure oil discharged from the inlet/outlet port 210*b* of the reversible pump 21 is caused to flow into the inlet port 361 of the priority valve 36. Of the pressure oil that has flowed into the inlet port 361, the pressure oil at the flow rate for storing of pressure, which flow rate is set for the priority port 362, flows to the priority port 362 prior to the pressure oil at the surplus flow rate, which is a flow rate obtained by subtracting the flow rate for storing of pressure set for the priority port 362 from the inflow flow rate set for the inlet port 361, flows to the bypass port 363. As a result, the storing of pressure in the accumulator 70 by means of the pressure oil that has flowed to the priority port 362 is started. Here, the hydraulic cylinder 10 continues to be driven (i.e., backward movement of the rod) by the pressure oil that is directed to the bypass port 363.

Next, the controller 61 determines that pressure information detected by the pressure sensor 40 indicates a pressure higher than the predetermined pressure, and that the storing of pressure in the accumulator 70 is to be ended. At the time, the controller 61 outputs, to the solenoid operated switching valve 35, an operation command to return to the state before the start of the pressure storing. Specifically, the controller 61 allows pressure oil to flow in both directions between the inlet/outlet port 210*b* of the reversible pump 21 and the rod chamber 12 of the hydraulic cylinder 10. Consequently, as with before the start of the pressure storing, the operating pressure of the hydraulic cylinder 10 becomes lower than the pressure at the priority port 362 of the priority valve 36. As a result, a flow of pressure oil toward the priority valve 36 is ceased. In this manner, the storing of pressure in the accumulator 70 is ended.

Advantageous Effects

As described above, according to the present embodiment, in the case of a hydraulic system that adopts a pump speed control method using the variable speed motor 22, the priority valve 36 is disposed on the pressure storage use oil passage 701 extending from the main oil passage 301*b* to the accumulator 70. Accordingly, pressure oil at a stable flow rate can be used for the storing of pressure in the accumulator 70 regardless of loads on the priority port 362 and the bypass port 363 as well as the operating speed of the hydraulic cylinder 10. Moreover, a pump dedicated for the storing of pressure in the accumulator 70 is not necessary, which makes it possible to realize a compact size of the hydraulic controller 2, and to eventually realize a compact size of the hydraulic system.

Further, according to the present embodiment, in the case of performing the feedback control of the rod position of the hydraulic cylinder 10, pressure oil is discharged from the inlet/outlet port 210*b* of the reversible pump 21 in a manner to compensate for a flow rate loss that corresponds to the flow rate of pressure oil that flows out of the priority port 362 of the priority valve 36 for the storing of pressure in the accumulator 70. Accordingly, pressure oil at the surplus flow rate, which is a flow rate obtained by subtracting the flow rate for the storing of pressure in the accumulator 70 from the flow rate at which the pressure oil is discharged from the inlet/outlet port 210*b*, assuredly occurs and flows through the bypass port 363 toward the rod chamber 12 of the hydraulic cylinder 10. Thus, stable control over the position of the hydraulic cylinder 10 can be performed regardless of presence or absence of pressure stored in the accumulator 70.

Embodiment 2

Figure 2:
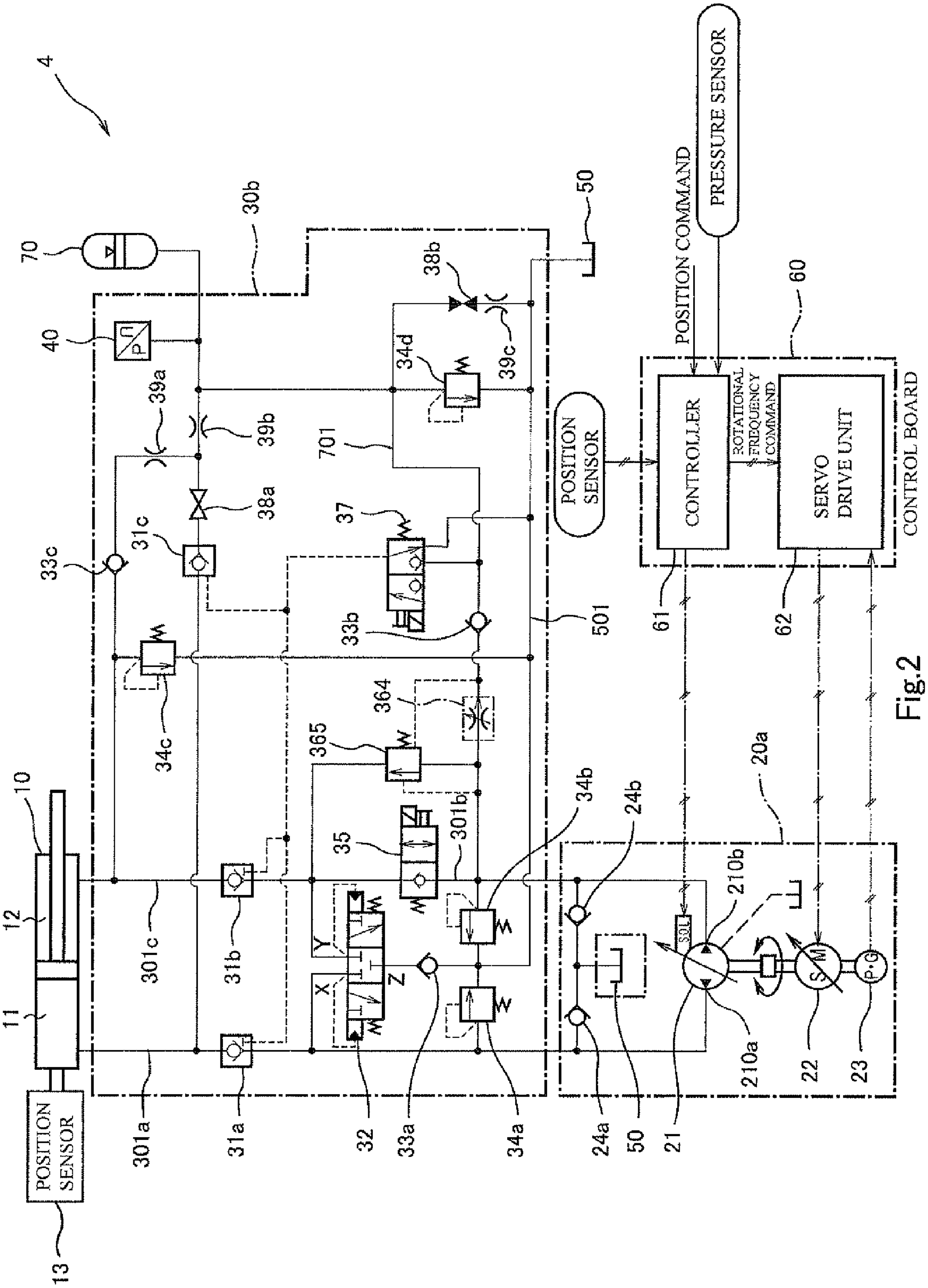
FIG. 2 shows an overall configuration of a hydraulic controller according to Embodiment 2 of the present invention.

FIG. 2 shows a configuration of a hydraulic controller configured to control a hydraulic actuator, according to Embodiment 2 of the present invention.

A hydraulic controller 4 shown in FIG. 2 is different from the hydraulic controller 2 shown in FIG. 1 in that the priority valve 36 is replaced by a flow rate control mechanism which is a combination of a flow rate adjusting valve 364 and a pressure control valve 365. Other than this difference, a valve unit 30*b* shown in FIG. 2 is the same as the valve unit 30*a* shown in FIG. 1.

The flow rate adjusting valve 364 is provided on the pressure storage use oil passage 701 between the main oil passage 301*b* and the accumulator 70. A rated flow rate (L) per unit time (per minute) is set for the flow rate adjusting valve 364. The flow rate of pressure oil flowing into the inlet port of the flow rate adjusting valve 364 is adjusted to the above rated flow rate per unit time, and then the pressure oil flows out of the flow rate adjusting valve 364 at the rated flow rate toward the accumulator 70.

The pressure control valve 365 is provided on an oil passage that branches off from the pressure storage use oil passage 701 at a position between the main oil passage 301*b* and the flow rate adjusting valve 364, and reaches the main oil passage 301*c* at a position between the pilot check valve 31*b* and the solenoid operated switching valve 35. It should be noted that if the hydraulic pressure at the inlet port of the flow rate adjusting valve 364 is higher than a predetermined pressure for the inlet port, and the hydraulic pressure at the outlet port of the flow rate adjusting valve 364 is higher than a predetermined pressure for the outlet port, then the pressure control valve 365 causes pressure oil to flow out toward the rod chamber 12 of the hydraulic cylinder 10 at a surplus flow rate which is obtained by subtracting the rated flow rate of the flow rate adjusting valve 364 from the flow rate of the pressure oil flowing into the inlet port of the flow rate adjusting valve 364. That is, the branch passage, which includes the pressure control valve 365, serves as the bypass port 363 of the priority valve 36.

In the present embodiment, the flow rate control mechanism, which has the same functions as those of the priority valve 36, is used, and therefore, the same advantageous effects as those of Embodiment 1 can be obtained in the present embodiment.

Embodiment 3

Figure 3:
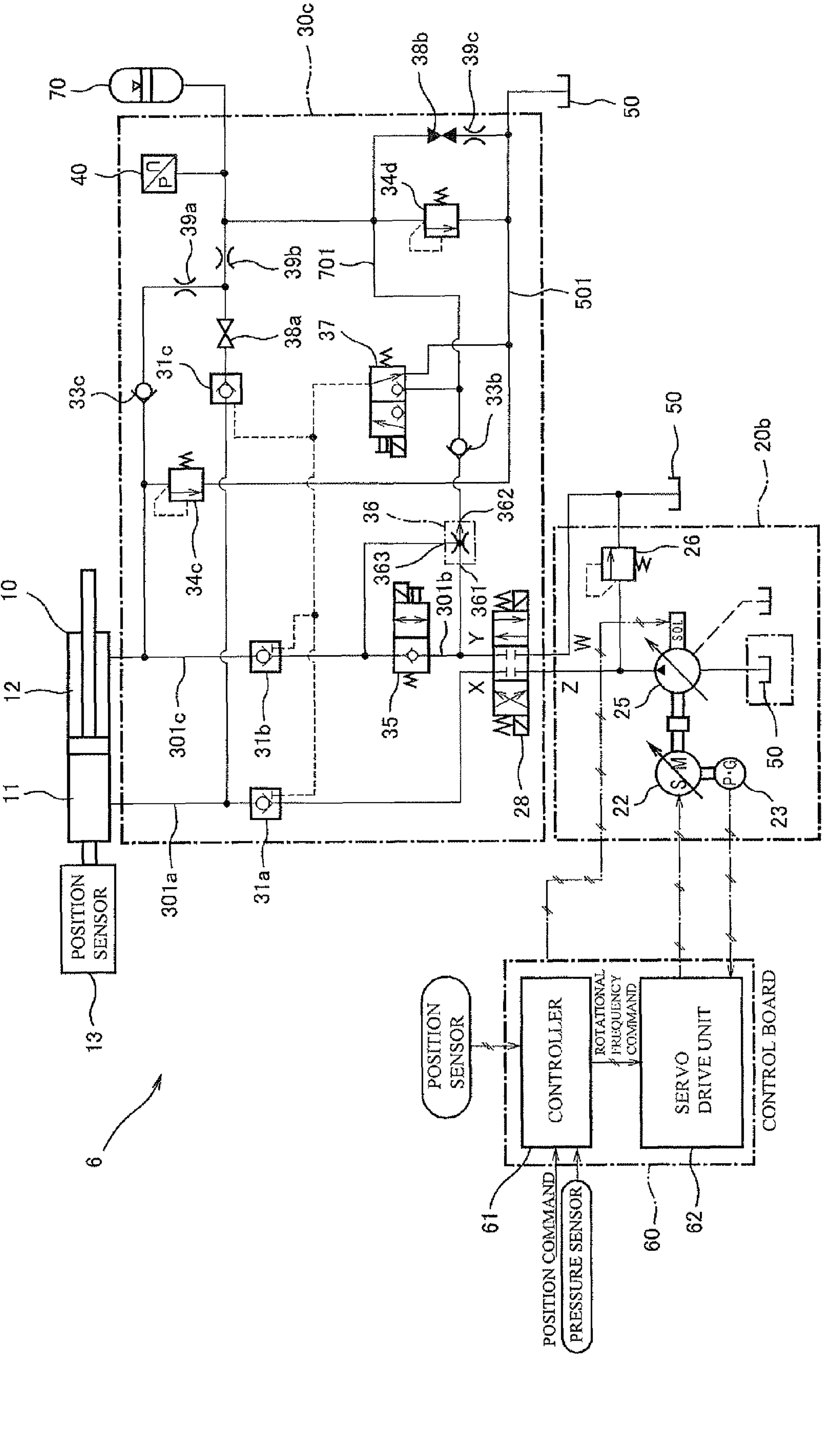
FIG. 3 shows an overall configuration of a hydraulic controller according to Embodiment 3 of the present invention.

FIG. 3 shows a configuration of a hydraulic controller configured to control a hydraulic actuator, according to Embodiment 3 of the present invention.

A hydraulic controller 6 shown in FIG. 3 is different from the hydraulic controller 2 shown in FIG. 1 in the following point: the hydraulic controller 2 shown in FIG. 1 is configured such that if surplus oil is produced when the hydraulic cylinder 10 is driven, the surplus oil is drained out into the oil tank 50, whereas the hydraulic controller 6 shown in FIG. 3 is configured such that pressure oil discharged from an oil pump 25 assuredly returns to the oil tank 50 through the hydraulic cylinder 10.

As compared to the hydraulic controller 2 shown in FIG. 1, in the hydraulic controller shown in FIG. 3, the reversible pump 21 is replaced by the hydraulic pump 25 which is configured to discharge pressure oil in a single flow direction; the hydraulic switching valve 32 is replaced by a four-port solenoid operated switching valve 28; the check valve 33*a*, the relief valves 34*a* and 34*b*, and the check valves 24*a* and 24*b* are eliminated; and a relief valve 26 is newly provided for the purpose of protection. It should be noted that the other configurations in a pump unit 20*b* and a valve unit 30*c* shown in FIG. 3 are the same as those in the pump unit 20*a* and the valve unit 30*a* shown in FIG. 1.

The oil pump 25 has only one discharge port. The rotational frequency of the oil pump 25 is controlled by the variable speed motor 22 which is connected to the drive shaft of the oil pump 25. Further, the oil pump 25 includes a solenoid valve configured to switch a preset pump capacity.

The four-port solenoid operated switching valve 28 includes two ports X and Z disposed on the main oil passage 301*a*, and two ports Y and W disposed on the main oil passage 301*b*. The port X is connected to the inlet port of the pilot cheek valve 31*a*, and the port Z is connected to the discharge port of the hydraulic pump 25. The port Y is connected to the solenoid operated switching valve 35, and the port W is connected to the oil tank 50. In the case of moving the rod of the hydraulic cylinder 10 forward, the four-port solenoid operated switching valve 28 is operated such that the port X and the port Z are connected to each other and the port Y and the port W are connected to each other. On the other hand, in the case of moving the rod of the hydraulic cylinder 10 backward, the four-port solenoid operated switching valve 28 is operated such that the port X and the port W are connected to each other and the port Y and the port Z are connected to each other.

The relief valve 26 is a pressure control valve which drains out pressure oil discharged from the hydraulic pump 25 into the oil tank 50 in a case where the hydraulic pressure at the discharge port of the hydraulic pump 25 is higher than a predetermined pressure.

According to the present embodiment, the same advantageous effects as those of Embodiment 1 can be obtained even in the hydraulic system where pressure oil discharged from the oil pump 25 assuredly returns to the oil tank 50 through the hydraulic cylinder 10.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structures and/or functional details may be substantially modified without departing from the spirit of the present invention.

INDUSTRIAL APPLICABILITY

The hydraulic controller according to the present invention is useful when applied as a hydraulic controller that is configured to control the rotational frequency of a hydraulic pump in order to supply pressure oil only in a necessary amount to a hydraulic actuator.

REFERENCE SIGNS LIST

2, 4, 6 hydraulic controller
10 hydraulic cylinder
11 head chamber
12 rod chamber
13 position sensor
20*a*, 20*b* pump unit
21 reversible pump
22 variable speed motor
23 rotational frequency detector
24*a*, 24*b* check valve
25 hydraulic pump
26 relief valve
28 four-port solenoid operated switching valve
30*a*, 30*b*, 30*c* valve unit
31*a*, 31*b*, 31*c* pilot check valve
32 hydraulic switching valve
33*a*, 33*b*, 33*c* check valve
34*a*, 34*b*, 34*c*, 34*d* relief valve
38*a*, 38*b* stop valve
39*a*, 39*b*, 39*c* throttle
35 solenoid operated switching valve
36 priority valve
361 inlet port
362 priority port
363 bypass port
37 solenoid operated switching valve
301*a* main oil passage
301*b* main oil passage (first main oil passage)
301*c* main oil passage (second main oil passage)
40 pressure sensor
50 oil tank
501 drain oil passage
60 control board
61 controller
62 servo drive unit
70 accumulator
701 pressure storage use oil passage

The invention claimed is:

1. A hydraulic controller comprising:

a hydraulic drive circuit driven by a variable speed motor and including a hydraulic pump configured to discharge pressure oil in an amount corresponding to a rotational frequency of the variable speed motor, the hydraulic drive circuit supplying to and receiving from a hydraulic actuator the pressure oil discharged from the hydraulic pump to drive the hydraulic actuator;

a hydraulic pressure storage circuit including an accumulator and configured to store the pressure oil in the accumulator and to supply the pressure oil stored in the accumulator to the hydraulic actuator in a predetermined case;

a flow rate control mechanism including an inlet port, a first outlet port, and a second outlet port, the flow rate control mechanism being configured such that:

the inlet port is connected to a first main oil passage through which the pressure oil discharged from the hydraulic pump of the hydraulic drive circuit flows, the first outlet port is connected to an oil passage leading to the accumulator of the hydraulic pressure storage circuit, the second outlet port is connected to a second main oil passage through which the pressure oil is supplied to the hydraulic actuator of the hydraulic drive circuit, and of the pressure oil that flows into the inlet port, the pressure oil at a flow rate for storing of pressure in the accumulator, which is a preset flow rate, flows out of the first outlet port, and the pressure oil at a surplus flow rate, which is a flow rate obtained by subtracting the flow rate for storing of pressure from the flow rate of the pressure oil flowing into the inlet port, flows out of the second outlet port; and a communication allowing/blocking device disposed between the first main oil passage and the second main oil passage and configured to alternatively allow or block communication between the first main oil passage and the second main oil passage.

2. The hydraulic controller according to claim 1, further comprising a pressure detector configured to detect pressure stored in the accumulator, wherein the communication allowing/blocking device is configured to:

allow the first main oil passage and the second main oil passage to be in communication with each other if the pressure detected by the pressure detector is higher than a predetermined pressure; and block the communication between the first main oil passage and the second main oil passage if the pressure detected by the pressure detector is lower than the predetermined pressure.

3. The hydraulic controller according to claim 1, wherein the flow rate control mechanism is a priority valve.

4. The hydraulic controller according to claim 1, wherein the flow rate control mechanism includes:

a flow rate adjusting valve of which an inlet port serves as the inlet port of the flow rate control mechanism and of which an outlet port serves as the first outlet port of the flow rate control mechanism; and a pressure control valve of which an inlet port is connected to the inlet port of the flow rate adjusting valve and of which an outlet port serves as the second outlet port of the flow rate control mechanism, and the pressure control valve is configured such that the inlet port and the outlet port of the pressure control valve are brought into communication with each other if a hydraulic pressure at the inlet port of the flow rate adjusting valve and a hydraulic pressure at the inlet port of the pressure control valve are higher than a predetermined pressure and a hydraulic pressure at the outlet port of the flow rate adjusting valve is higher than a predetermined pressure.

5. The hydraulic controller according to claim 1, wherein the flow rate control mechanism is a priority valve.

6. The hydraulic controller according to claim 1, wherein the flow rate control mechanism includes:

a flow rate adjusting valve of which an inlet port serves as the inlet port of the flow rate control mechanism and of which an outlet port serves as the first outlet port of the flow rate control mechanism; and a pressure control valve of which an inlet port is connected to the inlet port of the flow rate adjusting valve and of which an outlet port serves as the second outlet port of the flow rate control mechanism, and the pressure control valve is configured such that the inlet port and the outlet port of the pressure control valve are brought into communication with each other if a hydraulic pressure at the inlet port of the flow rate adjusting valve and a hydraulic pressure at the inlet port of the pressure control valve are higher than a predetermined pressure and a hydraulic pressure at the outlet port of the flow rate adjusting valve is higher than a predetermined pressure.

* * * * *